Jan. 26, 1926.  
J. T. TALBERT  
AUTOMATIC TIRE INFLATING MECHANISM  
Filed May 21, 1925

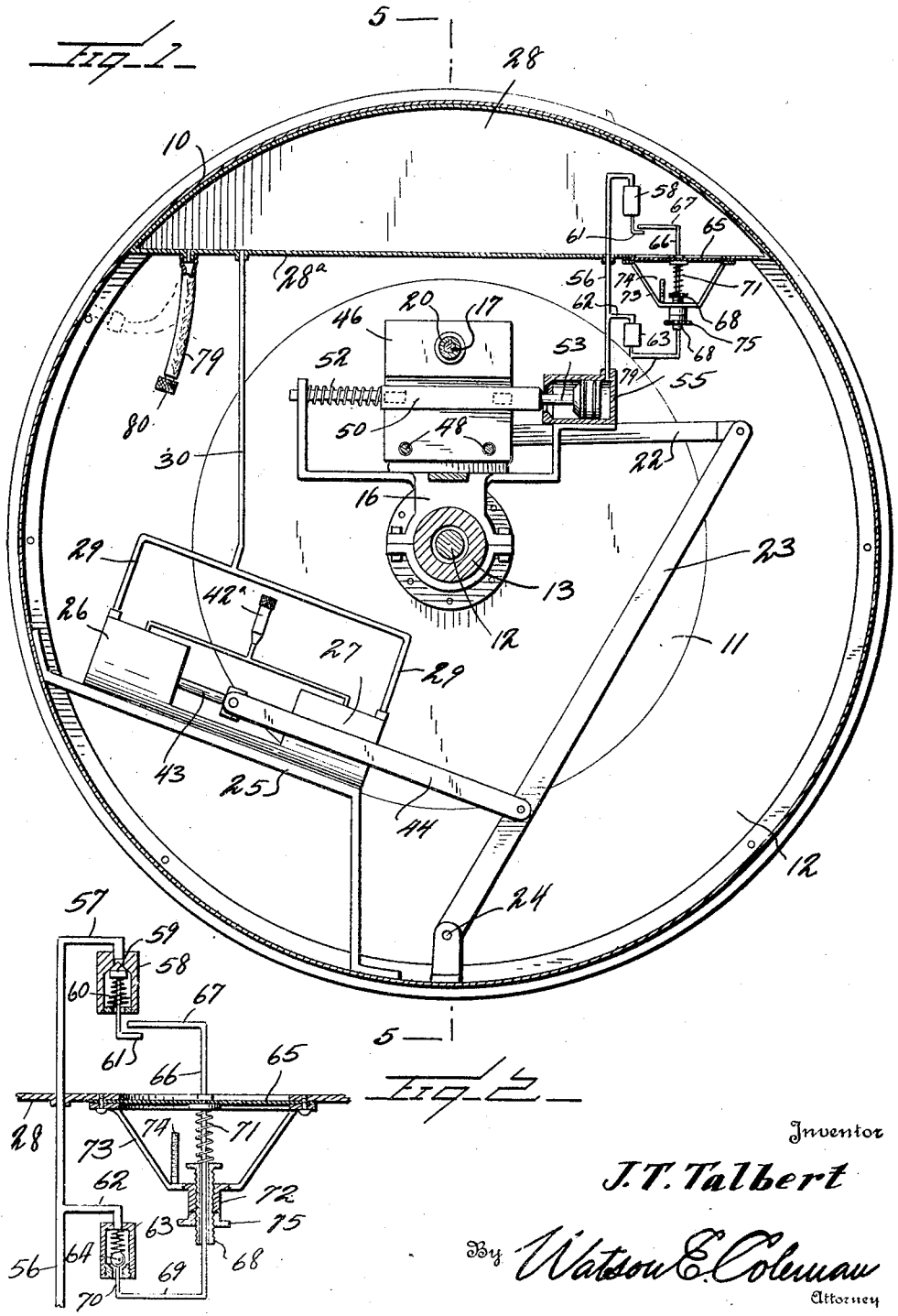

Inventor  
J. T. Talbert  
By Watson E. Coleman  
Attorney

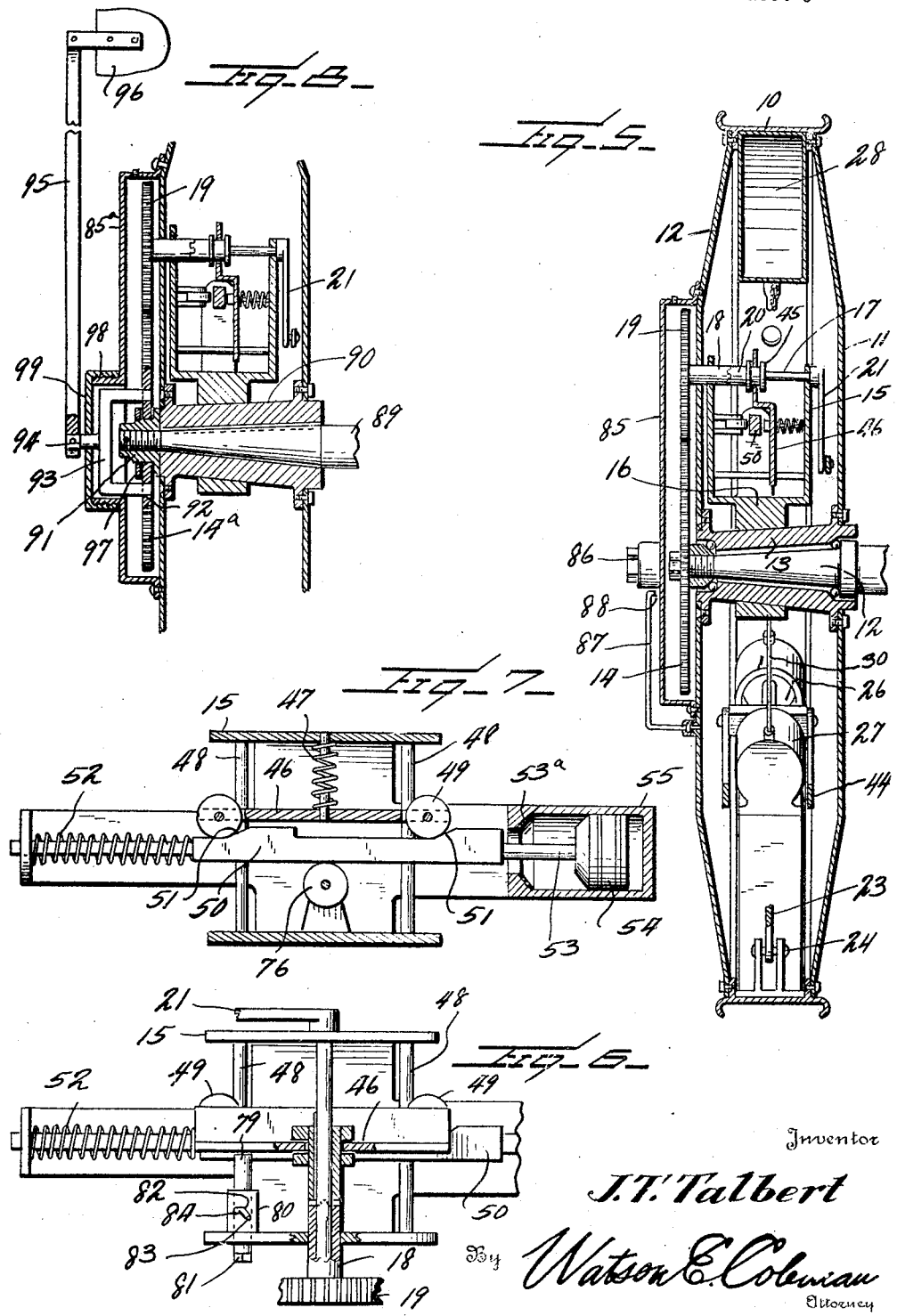

Patented Jan. 26, 1926.

1,571,072

UNITED STATES PATENT OFFICE.

JOHN T. TALBERT, OF BRADLEY, SOUTH CAROLINA.

AUTOMATIC TIRE-INFLATING MECHANISM.

Application filed May 21, 1925. Serial No. 31,893.

*To all whom it may concern:*

Be it known that I, JOHN T. TALBERT, a citizen of the United States, residing at Bradley, in the county of Greenwood and State of South Carolina, have invented certain new and useful Improvements in Automatic Tire-Inflating Mechanisms, of which the following is a specification, reference being had to the accompanying drawing.

This invention relates to means for pumping up tires, and particularly to a device of this character which is disposed within the wheel itself and is operated whenever the pressure within the tire falls below a predetermined amount, the mechanism then automatically starting up and operating until the pressure has returned to normal.

One of the objects of the present invention is to provide a device of this character which is entirely housed within the wheel, which is protected from dirt, dust or water, and which may be so set as to carry any desired air pressure within the tire.

A further object is to provide a device of this character wherein the greater portion of the mechanism is entirely idle, though the wheel be rotating, until the pressure within the tire falls below the predetermined amount, whereupon the mechanism will then start to operate.

A still further object is to provide means for controlling the starting and stopping of the mechanism, which includes a diaphragm or equivalent member operated by the air pressure within the tire, means being provided for adjusting this air pressure.

Another object is to provide a clutch which is shifted into or out of operative position by the air pressure and which will operatively engage an air pump with the driving mechanism of the car.

Still another object is to provide means whereby in case of the puncture of a tire the air pumping mechanism may be thrown out of operation.

A further object is to provide a pump for this purpose of an extremely simple character, which has a very simple valve, and which is, therefore, not liable to get out of order.

A still further object is to provide a mechanism of this character which may be applied with a slight modification either to the front wheels or to the rear wheels.

Other objects will appear in the course of the following description.

My invention is illustrated in the accompanying drawings, wherein:—

Figure 1 is a vertical sectional view through an automobile wheel (the tire, however, not being shown) provided with my improved pumping mechanism, the pumping mechanism being shown partly in section;

Figure 2 is an enlarged view of the diaphragm-operated controlling mechanism;

Figure 3 is a like view to Figure 1 but showing in elevation the other side of the wheel and the pumping mechanism;

Figure 4 is a longitudinal sectional view through the double acting pump;

Figure 5 is a vertical section on the line 5—5 of Figure 1;

Figure 6 is a fragmentary top plan view of the means for operating the clutch, the clutch being shown in section.

Figure 7 is a like view to Figure 6 but showing the clutch operating means in elevation;

Figure 8 is a like view to Figure 7 but showing the clutch per se in section.

Referring to these drawings, it will be seen that I have illustrated a vehicle wheel intended to carry a pneumatic tire and comprising the rim 10 supported by the inner disk 11 and the outer disk 12 which may be made of sheet steel or like material pressed into shape and carrying the hub 13 which engages in the usual manner with the axle 12. In Figures 1 to 7, I have illustrated this axle as being the front axle of the automobile, in other words the spindles which are mounted for steering movement. In Figure 8, however, I have illustrated the device as applied to the rear wall of the automobile.

Mounted upon the extremity of the spindle 12 or each front axle is a gear wheel 14 which, of course, does not turn but is held stationary, and extending through the front web or disk 12 and mounted upon a web 15 of a support 16 is a shaft 17, the opposite end of this shaft being carried within a sleeve 18 which extends through the disk 12 and carries upon it the gear wheel 19 which meshes with the gear wheel 14. Obviously, therefore, as the gear wheel 14 remains still and the wheel rotates, the gear 19 will be caused to travel around the wheel 14 and communicate rotary movement to the sleeve 18. This sleeve is mounted loosely upon the shaft 17 but the end of the sleeve is provided with clutch teeth, and splined upon the shaft 17 is a clutch sleeve 20 which, when shifted into engagement with the clutch sleeve 18, will cause the rotary motion of gear wheel 19 to be communicated to shaft 17. The end of the shaft 17 remote from the gear wheel 19 is provided with a crank arm 21 and this arm is connected by a link 22 to a lever 23 which is pivotally supported at 24 upon ears projecting inward from the wheel rim.

Mounted upon a supporting frame 25 is a pump, to the piston of which the lever 23 is operatively connected. This pump, as illustrated in Figures 3 and 4, is double-acting, that is, is provided with the two cylinders 26 and 27. Mounted within the wheel rim, and preferably attached to the wheel rim, is an air reservoir or tank 28, and extending from the cylinders 26 and 27 are the outlet pipes 29 which communicate with a single pipe 30 leading into the tank 28. At the junction of the outlet pipes 29 with the cylinders 26 and 27 there is provided the check valves 31 held to their seats by the springs 32, each check valve permitting the passage of air into the tank 28 but preventing the passage of air therefrom.

Operating within each cylinder is a piston comprising an outer shell or cylinder 33. The inner end of this cylinder has a transversely extending web 34 with a central aperture 35, and the interior of the cylinder is formed to provide the conical seat 36. Operating within the chamber defined by the cylinder 33 is the valve 37 which is formed at its forward end with a conical face 38 adapted to fit against the conical seat 36 when the valve is moved forward, but when the valve is retracted upon a backward movement of the piston the face 38 will separate from the face 36, thus leaving a space through which air may pass. The margin of the valve is formed with flutes or ducts 39 and the rear end of the cylinder 33 is closed by a plate 40 having openings 41 by which air may enter into the interior of the piston, pass around the valve 37, and thereby through the perforation 34 into the interior of the cylinder 26 or 27, as the case may be. The piston is provided with the usual rings and is likewise provided with any suitable lubricating means indicated by the lubrication duct 42.

Engaged with the valve 37 is the connecting rod 43 to which a pair of links 44 are pivotally connected in any suitable manner, as by means of a cross head, these links 44 in turn being pivoted to the lever 23. It will be obvious, therefore, that when the clutch is thrown in an oscillatory movement will be transmitted to the lever 23. This will alternately shift the pistons so as to alternately compress air in the two cylinders 26 and 27 and this air will be forced in a continuous stream up into the reservoir 28.

For the purpose of cutting off the operation of the pump when a certain predetermined pressure of air has been secured within the reservoir 28, I provide the shiftable clutch 20 heretofore referred to and provide pressure operated means for shifting the clutch member 20 out of its engagement with the clutch member 18. To this end the clutch member 20 is provided with the spool 45 engaged by a plate 46, as shown in Figure 6, the plate being mounted upon the frame 16 for oscillatory movement and being urged in a direction to shift the clutch members 20 and 18 into engagement with each other by means of the compression spring 47.

For the purpose of shifting the plate 46 in a direction to carry the clutch member 20 out of engagement with the clutch member 18 and against the force of the spring 47, I mount the plate 46 upon transversely extending guide pins 48, as shown in Figure 7, and provide the plate 46 with two rollers 49. Coacting with these rollers is a rectilinearly movable cam 50 having two inclined cam faces 51, one for each of the rollers. A coiled compression spring 52 urges this cam toward the right in Figure 7 and at the opposite end the cam carries a piston rod 53 engaging with a piston 54 mounted within the cylinder 55. Preferably the piston 54 is conical at its rear end and the rear end of the cylinder 53 is formed with a downwardly converging, conical seat 53$^a$ against which the conical face of the piston is adapted to seat, this seat 53$^a$ being preferably covered with rubber or other yielding material so as to hold the air within the cylinder and prevent any leakage of air when the piston is forced outward.

This cylinder 55, as shown in Figure 3, is connected by a pipe 56 to the interior of the air reservoir 28. That end of the pipe 56 within the reservoir 28 is provided with a branch 57 having a valve chamber 58 wherein is disposed an outwardly opening valve 59 held in place by means of a spring 60. This valve has a stem which is formed with a laterally extending extremity 61. Extending from the pipe 56 is a branch pipe 62 which is provided with a valve casing 63 having therein the upwardly opening ball valve 64.

Disposed in the outer wall 28$^a$ of the reservoir 28 is a diaphragm 65 or like pressure responsive element. This diaphragm may be made of rubber, leather, thin metal or any other suitable material, and it will be understood that I have simply illustrated this diaphragm conventionally. Carried upon this diaphragm and shifting therewith is a valve operating rod 66, that end of the rod which is disposed within the chamber 28 being formed with a laterally extending arm 67 which is disposed in alignment with or overlaps the arm 61 but is spaced therefrom, as shown in Figure 2, so that when the diaphragm 65 is pressed outward by pressure of air within the chamber 28, this valve 59 will be opened and when the pressure falls to a predetermined amount, which is the amount normally intended to be carried within the reservoir 28, the diaphragm will move inward sufficiently far to release the valve 59 and permit it to close under the impulse of the spring 60. This rod 66 extends down through a screw-threaded sleeve 68 and at its outer end, that is, the end exterior to the reservoir 28, is angularly bent to form an arm 69 having a portion 70 which extends up into the valve casing 63 and is adapted to bear against the ball 64 and lift it from its seat. The branch 62 and this valve casing 63 of the valve 64 constitute an arcuate valve for the air behind the piston 54.

A coiled spring 71 coiled around the rod 66 bears against the diaphragm 65 and urges it toward the reservoir 28 and the opposite end of this spring bears against the sleeve 68, which is screw-threaded within a suitable sleeve 72 mounted upon a supporting yoke 73 or spider. A scale 74 is also carried by this yoke and the sleeve 68 may be adjusted by rotating it in accordance with this scale to increase or decrease the pressure on the spring 71 and thereby adjustably determine the pressure which will cause the outward bulging of the diaphragm 65. A set nut 75 will hold the sleeve 68 in its adjusted position.

It will be seen that with this device when the pressure within the tank 28 falls, the diaphragm will move inward under the pressure of the exterior air and under the pressure of the spring 71. This will carry the arm 67 away from the valve spindle 61 and also move the portion 70 of the rod upward against the valve 64. This will let out any air that may be trapped within the cylinder 55 behind the piston 54 and thus the spring 52 may act upon the plate or lever 46 to cause the clutch member 20 to shift toward the clutch member 18, thereby operatively engaging the gear wheel 19 with the shaft 17 and causing the operation of the pump. Air is now pumped into the tank 28, which gradually forces out the diaphragm 65. When the diaphragm has been forced out a predetermined amount, it will draw the rod 66 outward, which will cause the opening of the valve 59 so that air may pass through the pipe 57 into the cylinder 55 and this will force out the piston 54 and shift the clutch supporting plate 46 in a direction away from the cam 50 and thus shift the clutch member 20 out of engagement with the clutch member 18, whereupon the pump will stop. It will be seen from Figure 7 that the cam 50 is held against the rollers 49 by means of the roller 76 which is mounted upon the supporting frame.

One of the disks, as for instance the disk 12, is formed with an aperture 77 normally closed by a plate 78 whereby access may be had to the adjusting sleeve 68 so as to adjust the tension of the spring 71. Of course, the tension of this spring does not have to be adjusted unless it is desired to change the normal pressure of air contained within the tank 28 and this would not occur unless one make of tire was being changed to another make of tire where greater or less pressure had to be used.

From the tank 28 extends a flexible pipe 79 having thereon the usual valve head 80 whereby it may be connected to the usual nipple which extends inward from the inner tube of the tire. Access may be had to this tube 79 through an aperture in either the disk 12 or the disk 11 if desired, this aperture being normally closed by a plate in the same manner as the aperture 77 disclosed by the plate 78.

In case of a puncture it is, of course, necessary to stop the operation of the pump so as to permit the car to run upon its rim or with a deflated tire until the tire can be mended. For this purpose I provide means whereby the clutch plate 46 may be shifted by hand in a direction to carry the clutch members 18 and 20 out of engagement with each other. To this end I have provided an inwardly projecting pin 79 mounted in a suitable guide sleeve 80 (see Figure 6) and this pin extends through to the exterior of the disk 12 and is provided with a head 81 whereby it may be turned. The sleeve 80 has an angular slot 82 and a pin 83 extends out from the pin 79 and engages in this slot. Obviously, therefore, as the pin 81 is turned in a counterclockwise direction in Figure 6, the cam slot 82 will force the pin 79 inward and this will bear against the clutch 46 and shift it in a direction which will cause the release of engagement between the two clutch members 18 and 20, and the cam slot 82 is formed with a seat 84 within which the pin 83 may be disposed to lock the pin 79 in its inwardly projected position.

In case the tire of the front wheel is entirely deflated, it will obviously be necessary to inflate it before the car can take the road. The rear wheels can be spun when jacked up and thus compressed air may be secured within the tanks 28 for these rear wheels, but this obviously is not the case with the front wheels. Therefore, I preferably provide each of the front wheels with some means whereby the front wheels may be turned by hand when the front of the car is jacked up to thus cause the action of the tire pumping mechanism. Thus a small handle may be provided on the front wheel like a crank handle whereby this may be accomplished. Obviously, when a tire gets so worn that it will not stand the normal pressure of air, the pressure adjusting sleeve 72 can be adjusted to reduce the pressure which is kept within the reservoir 28 and within the tire.

As is illustrated in Figure 5, it will be seen that the gears 14 and 19 are enclosed within a dished housing 85 having preferably an imitation hub cap 86 attached thereto, and in order to supply air to the air pumps I may provide an air induction pipe 87, also shown in Figure 5, which for a portion of its distance extends parallel to the housing 85 and terminates adjacent the false hub cap 86 by an inwardly turned intake nipple 88. This is inwardly turned and disposed close to the hub cap so as to prevent dust, dirt, rain and other foreign matter from obstructing the inlet of air and to keep this air relatively clean.

While on the front wheel the axle or spindle 12 is stationary, on the rear wheel of automobiles a different state of facts is present, in that the axle rotates, and, therefore, means must be provided for holding the gear wheel 14$^a$ which corresponds to the gear wheel 14 from any rotation. In Figure 8 the rear axle is designated 89, and mounted upon this rear axle is the hub 90 which rotates with the axle, there being a nut 91 which engages the hub with the axle. Loosely mounted upon this nut in order to permit the nut to rotate within it is the gear wheel 14$^a$. This gear wheel is shown as provided with two openings 92 and a spanner 93 is provided whose arms extend into said openings and this spanner arches over the nut 91. The spanner is formed with a central stem 94, and attached to this stem is a rod 95 which extends to the running board, the fender, or any other convenient part, designated 96.

Thus it will be seen that though the axle rotates, the gear wheel 14$^a$ does not. The gear wheel is held in place upon the nut or cap 91 by means of the small nut 97. The plate 85$^a$ which houses the gear wheel 14$^a$ and the gear wheel 19 has an outstanding annular flange 98 upon which is mounted a cap 99 which has a central perforation for the passage of the stem 94. Otherwise than as above described this construction shown in Figure 8 is precisely the same as that shown in Figure 5 and operates in precisely the same manner. The housings 85 and 85$^a$ are intended to be filled with lubricating oil so that the gears 14 and 19 and 14$^a$ and 19 will operate within the oil. I have not attempted to illustrate any system of lubricating the mechanism but this may be very readily arranged, and for the pump I have merely shown the ducts 42 as being connected to an oil cup 42$^a$, but this is purely diagrammatic.

The operation of the specific parts of this mechanism has been heretofore described, but the general operation is as follows: Normally the clutch is retracted so that the gears 14 and 19 or 14$^a$ and 19 rotate without communicating any movement to the shaft 17 or to the pumping mechanism. This is for the reason that the clutch 20 is held out of engagement with the clutch member 18 because of the pressure of air behind the piston 54, which holds the plate 46 outward against the pressure of the spring 47. The valve mechanism shown in Figure 2 is in the position illustrated in this figure, the spring 60 being of sufficient strength to prevent the escape of any air through the pipe 56 until the valve 59 is positively opened. In case the pressure of air decreases within the tire and, therefore, within the reservoir 28, the diaphragm 65 moves inward, carrying with it the rod 66, and this lifts the ball 64 from its seat so as to permit the discharge of air from behind the piston 54, as shown best in Figure 1. As soon as pressure within the cylinder 55 is relieved, the spring 52 acts to force the cam to the right in Figure 7 and the spring 47 operating then shifts the lever 46 toward the left in Figure 5, shifting the clutch member 20 into engagement with clutch member 18, thus giving power to the shaft 17. This operates the pumping lever 23, which operates the pump. The pump commences to reciprocate and force air into the pipe 30 and into the reservoir 28. Air then passes into the reservoir 28 and when the pressure within the reservoir has been built up to the proper degree, the pressure in the cylinder 55, which is the same as the pressure within the reservoir 28, will act to force the piston 54 to the left in Figure 7, shifting the lever in a direction against the action of spring 47, which disconnects the clutch member 20 from the clutch member 18 so that power is no longer applied to the pump.

It is to be understood that as regards valves 59 and 64 that always one valve will be closed before the other is opened. Thus air is not permitted to escape into space. The valves are to be opened and closed as has been explained. The valve 59 is to remain open as long as the desired amount of pressure is within the reserve tank and the tire to inflate cylinder 55 which controls the piston 54 when air has been inflated in cylinder and throws clutch out of gear. As soon as the pressure in the reserve tank gets below the desired amount, valve 59 is allowed to close and as soon as this valve is closed valve 54 will be opened and permit air to escape from the cylinder 55, thus permitting piston 54 to be forced to opposite end of the cylinder 55 through the tension of spring 52 which throws the clutch into gear. Valve 64 is to remain open as long as the pumps are inflating the reserve tank. As soon as the desired amount of pressure has been pumped back into the reserve tank, the valve 64 is again closed and through the action of diaphragm 65 the valve 59 immediately opens again, which feeds pressure to the cylinder 55 and causes the piston to force clutch out of gear, thereby shutting down the pumping and the pumping apparatus remains out of gear until pressure again falls below the desired amount.

The extent to which air will build up within the reservoir 28 depends entirely upon the tension of spring 21 and this in turn will be governed by the adjustment of the adjusting sleeve 68. The operation of the pump will be obvious and it is pointed out that the valve mechanism of this pump is extremely simple and positive in its action. In view of the fact that the valves themselves are mounted upon the connecting rod 43 and oscillate therewith and are of relatively large size and operate within a relatively large chamber contained within the piston, the inconvenience incident to the ordinary pumping valve mechanism with its small parts and springs is avoided. My pump valves are positive in their action and the greater the pressure against the head of the piston, the tighter will be the joint between the conical face 34 of the valve and the conical face 36 of the piston, while on the back stroke the valve is positively opened by reason of the fact that it shifts before the piston does. If the tire goes entirely down by reason of a blow-out or puncture, it is obvious that after the puncture has been repaired it will be necessary to re-inflate the tires. This re-inflation may be readily secured by lifting the rear end of the machine by a jack and the inflation of the front tires by lifting the forward end of the machine up on a jack and then rotating the punctured tire by hand as, for instance, my means of a crank pin detachably engaged with the wheel or any other means may be used for rotating this wheel. Of course, the rear wheels can be driven under their own power and, therefore, do not require any means whereby they may be rotated manually. In case of a small puncture or a slow leak, my system will keep the tire inflated while out on the road until the driver can get to a repair shop in case the driver does not wish to stop and lose the time fixing the tire, but, of course, in case of too bad a puncture or blow-out it will be necessary to throw the pumping system out of gear, as before described, and allow the wheel to run on the rim or else stop and fix the tire.

While I have illustrated certain details of construction and arrangement of parts which I believe to be particularly effective, I do not wish to be limited therto as it is obvious that many changes might be made in these details and in the arrangement of parts without departing from the spirit of the invention as defined in the appended claims. My device is relatively simple, has the advantage that the pumping mechanism is disposed as a unit within each wheel, making each wheel a unitary article. The device may be made relatively light and yet strong and the mechanism so arranged as to fully balance the wheel in all positions.

While I have illustrated a specific form of pump, I do not wish to be limited thereto as other forms of pump might be used. Preferably I use a double acting pump but this is merely advisable and not absolutely necessary. Access may be readily had to the interior of the wheel by removing one of the plates 11 or 12, it being obvious that if it is desired to remove the plate 12 the housing 85 must be first removed, the gear wheels 14 and 19 withdrawn from engagement with their shafts, and then the disk 12 removed, this disk being detachably engaged with the rim and with the hub. It will be seen that the mechanism is entirely housed and thereby protected from dirt and dust.

I claim:

1. The combination with a vehicle wheel having a pneumatic tire, of means for keeping the pneumatic tire inflated comprising an air chamber disposed within the wheel, a gear wheel co-axial with the vehicle wheel and held from rotation, an air pump mounted within the wheel, means for driving the pump including a gear wheel meshing with the first gear wheel and rotating therearound, a clutch device shiftable to operatively connect the pump with the second gear wheel or disconnect it therefrom, a motor operatively connected to the clutch to shift the same when the motor is operated, a pressure responsive member operated by the pressure of air in the air chamber and acting when the pressure is greater than a predetermined amount to cause the operation of the motor and shift the clutch device to its inoperative position and when the pressure is less than the predetermined amount to shift the clutch device to its operative position.

2. The combination with a vehicle wheel having a pneumatic tire thereon, of means for keeping the pneumatic tire inflated comprising an air chamber disposed within the wheel, a gear wheel co-axial with the vehicle wheel and held from rotation, an air pump mounted within the wheel, means for driving the pump including a gear wheel meshing with the first gear wheel, a clutch device shiftable to operatively connect the pump with the second gear wheel or disconnect it therefrom, a motor for operating the clutch including a cylinder and a piston therein operatively connected to the clutch, the cylinder behind the piston being connected to the air chamber, a spring operating to urge the piston into the cylinder, and means controlling admission of air to the cylinder and the discharge of air therefrom including a pressure responsive element operated by the air in the reservoir.

3. The combination with a vehicle wheel having a pneumatic tire thereon, of means for keeping the pneumatic tire inflated comprising an air chamber disposed within the wheel, a gear wheel co-axial with the vehicle wheel and held from rotation, an air pump mounted within the wheel, means for driving the pump including a gear wheel meshing with the first gear wheel, a clutch device shiftable to operatively connect the pump with the second gear wheel or disconnect it therefrom, a motor for operating the clutch including a cylinder and a piston therein operatively connected to the clutch, the cylinder behind the piston being connected to the air chamber, a spring operating to urge the piston into the cylinder, means controlling admission of air to the cylinder and the discharge of air therefrom including a pressure responsive element operated by the air in the air chamber, means for yieldingly resisting the movement of the pressure responsive element in one direction, and means for adjusting the degree of resistance of said element.

4. The combination with a vehicle wheel having a pneumatic tire thereon, of means for keeping the pneumatic tire inflated comprising an air chamber disposed within the wheel, a gear wheel co-axial with the vehicle wheel and held from rotation, an air pump mounted within the wheel, means for driving the pump including a gear wheel meshing with the first gear wheel, a clutch device shiftable to operatively connect the pump with the second gear wheel or disconnect it therefrom, a motor for operating the clutch including a cylinder and a piston therein operatively connected to the clutch, a pipe leading from the cylinder behind the piston and extending into the air chamber and having a branch provided with an outwardly opening valve, a second branch from said pipe disposed exteriorly of the air chamber and provided with an inwardly opening valve, springs urging said valves to their seats, a pressure responsive element forming part of the wall of the air chamber, a rod actuated by said element, a spring resisting movement of the pressure responsive element outward from the air chamber, and means carried by said element adapted to open the first named valve when the pressure responsive element is forced outward by the pressure within the air chamber and to open the second named valve when the pressure responsive element moves inward upon a reduction of pressure within the air chamber.

5. The combination with a vehicle wheel having a pneumatic tire thereon, of means for keeping the pneumatic tire inflated comprising an air chamber disposed within the wheel, a gear wheel co-axial with the vehicle wheel and held from rotation, an air pump mounted within the wheel, means for driving the pump including a gear wheel meshing with the first gear wheel, a clutch device shiftable to operatively connect the pump with the second gear wheel or disconnect it therefrom, a motor for operating the clutch including a cylinder and a piston therein operatively connected to the clutch, a pipe leading from the cylinder behind the piston and extending into the air chamber and having a branch provided with an outwardly opening valve, a second branch from said pipe disposed exteriorly of the air chamber and provided with an inwardly opening valve, springs urging said valves to their seats, a pressure responsive element forming part of the wall of the air chamber, a rod actuated by said element, a spring resisting movement of the pressure responsive element outward from the air chamber, means carried by said element adapted to open the first named valve when the pressure responsive element is forced outward by the pressure within the air chamber and to open the second named valve when the pressure responsive element moves inward upon a reduction of pressure within the air chamber and means for adjustably tensioning said spring.

6. The combination with a vehicle wheel and a pneumatic tire thereon, of means for keeping the pneumatic tire inflated comprising a reservoir disposed within the wheel, an air pump mounted within the wheel, means for driving the pump when the wheel rotates, a clutch device shiftable to operatively connect the pump with the driving means therefor or operatively disconnect it therefrom, a motor for the clutch device including a cylinder and a piston operating therein, a tube extending from the cylinder into the interior of the reservoir and having two branches, one within the reservoir and the other exterior thereto, an outwardly opening valve in the branch disposed within the reservoir, an inwardly opening relief valve in the branch exterior to the reservoir, a diaphragm forming part of the wall of the reservoir, a rod connected thereto and moving therewith and adapted upon an inward movement of the diaphragm to open the second named valve and upon an outward movement of the diaphragm to open the first named valve, a spring resisting outward movement of the diaphragm, and means for adjustably controlling the tension of said spring.

7. The combination with a vehicle wheel having a pneumatic tire thereon, means for keeping the pneumatic tire inflated comprising an air chamber disposed within the wheel, a gear wheel co-axial with the vehicle wheel and held from rotation, an air pump mounted within the wheel, means for driving the pump including a gear wheel meshing with the first named gear wheel, a clutch device shiftable to operatively connect the pump with the second named gear wheel or disconnect it therefrom, said clutch device including a slidable member, a lever operatively connected thereto, a spring urging said lever in a direction to shift the clutch device to its operative position, means for shifting the clutch device out of its operative position including a longitudinally shiftable cam, a spring urging the cam in one direction, and a motor urging the cam in the other direction and operated by the pressure of air within the air chamber.

8. The combination with a vehicle wheel having a pneumatic tire, of means for keeping the pneumatic tire inflated comprising an air chamber disposed within the wheel, a gear wheel co-axial with the vehicle wheel and held from rotation, an air pump mounted within the wheel, means for driving the pump including a gear wheel meshing with the first named gear wheel and rotating therearound and carrying a clutch member, a second clutch member shiftable into or out of engagement with the first named clutch member, means urging the second named clutch member out of its operative position, means for shifting the shiftable clutch member into its operative position including a cam, a pressure operated motor therefor, and a pressure responsive element controlled by the pressure within the air chamber acting to admit air from the reservoir to the motor to thereby shift the cam in one direction or permit the escape of air from said motor to thereby shift the cam in the opposite direction.

9. The combination with a vehicle wheel having a pneumatic tire, of means for keeping the tire inflated comprising an air chamber disposed within the wheel, a pump operatively conected to the air chamber, means for driving the pump including a member rotated by the rotation of the wheel but normally disconnected from the pump, of means for automatically connecting said driving member with the pump when the pressure within the air chamber has fallen below a predetermined point, means for automatically disconnecting the pump from its driving means when the pressure within the air chamber has risen beyond a predetermined point, and means for manually disconnecting the pump from the operating means.

10. The combination with a vehicle wheel having a pneumatic tire, of means for keeping the pneumatic tire inflated comprising an air chamber disposed within the wheel, an air pump operatively connected to the air chamber, driving means for the pump operated by the rotation of said wheel, means for automatically connecting said driving means with the pump when the pressure within the air chamber has decreased beyond a predetermined point and for automatically disconnecting the pump from the driving means when the pressure has increased beyond a predetermined point including a slidable clutch member, a motor for shifting said clutch member, manually operable means for shifting said clutch member into its inoperative position and holding the clutch member in its inoperative position including a longitudinally shiftable and rotatable member adapted to operatively engage the clutch, a sleeve through which it passes, the sleeve being formed with an angular slot, and a pin on said member engaging in said slot.

In testimony whereof I hereunto affix my signature.

JOHN T. TALBERT.